Patented June 9, 1925.

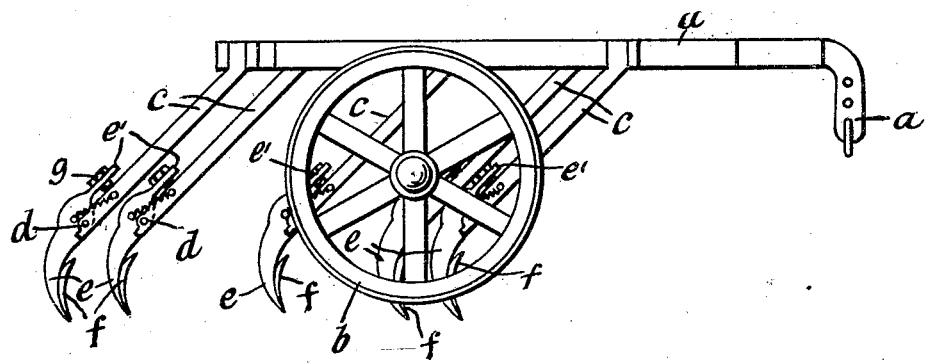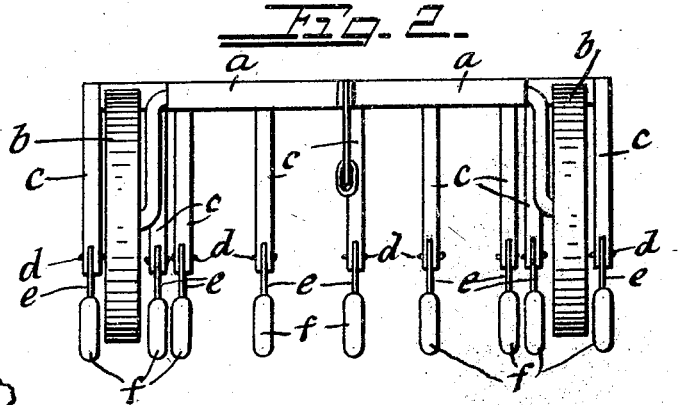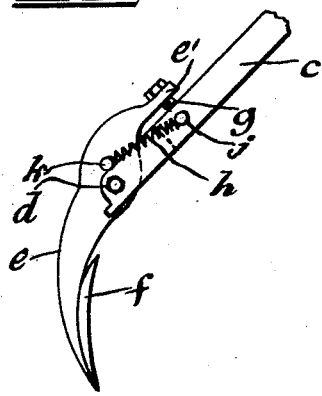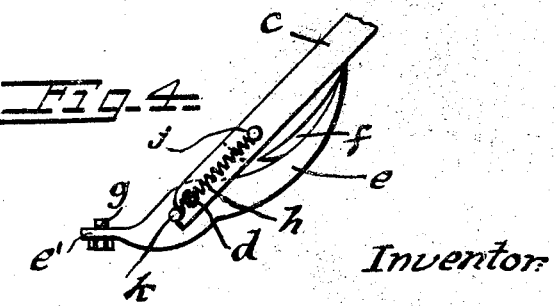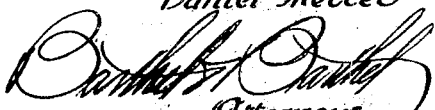

1,541,162

UNITED STATES PATENT OFFICE.

DANIEL MERCER, OF KIRKBY, NEAR LIVERPOOL, ENGLAND.

AGRICULTURAL IMPLEMENT.

Application filed October 30, 1922. Serial No. 598,030.

*To all whom it may concern:*

Be it known that I, DANIEL MERCER, a subject of the King of England, residing at Tithebarn Farm, Kirkby, near Liverpool, in the county of Lancaster, England, have invented certain new and useful Improvements in or Relating to Agricultural Implements, of which the following is a specification.

This invention relates to land cultivators, sub-soilers, farm tractors, and like agricultural implements, and has for its object to provide a construction whereby a shank will withdraw itself from the land automatically when the implement is moved rearwardly, or reversed.

In carrying out my invention, I provide a suitable standard whereto is pivotally or hingedly connected a shank which in the forward movement of the implement will scarify, cultivate, or open out the soil and will automatically withdraw from the land on the rearward or reverse movement of the implement. Spring means may be provided which tend to maintain the shank in an operative position and hold it in an inoperative position, when required.

I will further describe my invention with the aid of the accompanying sheet of explanatory drawings which illustrate, by way of example only, one mode of embodying same.

In said drawings:—

Fig. 1 is an elevation,

Fig. 2 an end view, and

Figs. 3 and 4 are enlarged views as compared with the preceding figures, illustrating the shank in operative and inoperative positions.

The letter $a$ designates the frame of the cultivator and $b$, $b$ its wheels. To said frame $a$ are secured a suitable number of standards $c$, at the lower end of each of which is pivotally mounted on a spindle $d$ a shank $e$, $e^1$ the lower arm $e$ (whereon is fitted a renewable shovel $f$) constituting the shank proper, whilst the upper arm $e^1$ is provided with a regulating screw $g$ which is adapted to bear on the standard $c$: by appropriate adjustment of said screw $g$ the angle at which the shank enters the land may be governed. The part designated $h$ is a coiled spring one end whereof is connected to the standard $c$ at $j$ and the other end is connected to the shank $e$, $e^1$ at $k$. Said spring $h$ tends to maintain screw $g$ in contact with its standard $c$ and so hold the shank in operative position.

If, however, the cultivator is moved rearwardly, the shank $e$, $e^1$ will turn or rock about its pivot $d$ against the resistance of spring $h$ and automatically withdraw from the land.

In Fig. 4 of the drawings, the shank is shown as having been raised by hand—as when it is required to move the implement on a roadway—to an inactive position and lying on the underside of its standard $c$. Said shank $e$, $e^1$ is thus maintained (until wilfully moved into position for use) by spring $h$, the points of connection of the spring $h$ with the standard $c$ and shank $e$, $e^1$ being predetermined, as shown, to effect this end.

A shank and its standard, may, with advantage, be located behind a wheel of a self-propelled agricultural or farm tractor vehicle for the purpose of scarifying, cultivating or breaking open land, the surface whereof is more or less hardened or solidified by the tractor wheel, prior to the passing of the harrow, plow, or other agricultural implement which is being drawn by the tractor.

Having now described my invention, what I claim as new and desire to secure by Letters Patent is:—

1. In agricultural implements, wherein a shank and its shovel form a unit pivotally carried by its supporting standard in a manner to prevent movement of the shovel rearwardly and permit movement of the shovel forwardly and with the unit adjustable to adjustably limit its extreme movement rearwardly, resilient means operatively connecting the unit and standard to normally return the unit to such rear extreme position when moved therefrom to an intermediate portion of the unit range of movement, and operative to retain the unit in its inactive position when the unit has been moved beyond such intermediate portion of the unit range of travel.

2. An implement as in claim 1 characterized in that the resilient means is in the form of a coiled tension spring secured to the unit at one side of the unit pivot with the securing position such that the movement of the unit toward and into its inactive position will carry the spring end to the opposite side of the pivot.

In testimony whereof I affix my signature in the presence of two witnesses.

DANIEL MERCER.

Witnesses:
   JOHN H. WALKER,
   I. F. V. HINDLEY WALKER.